(12) United States Patent
Harpal et al.

(10) Patent No.: US 10,309,341 B2
(45) Date of Patent: Jun. 4, 2019

(54) THRUST REVERSER CASCADE SYSTEMS AND METHODS

(71) Applicant: The Boeing Company, Chicago, IL (US)

(72) Inventors: Naimishkumar B. Harpal, Everett, WA (US); Chen Chuck, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 699 days.

(21) Appl. No.: 14/997,295

(22) Filed: Jan. 15, 2016

(65) Prior Publication Data

US 2017/0204810 A1    Jul. 20, 2017

(51) Int. Cl.
| | |
|---|---|
| *F02K 1/72* | (2006.01) |
| *F02K 1/70* | (2006.01) |
| *B64D 29/02* | (2006.01) |
| *B64D 29/04* | (2006.01) |
| *B64D 33/04* | (2006.01) |
| *F02K 1/62* | (2006.01) |

(52) U.S. Cl.
CPC .............. *F02K 1/72* (2013.01); *B64D 29/02* (2013.01); *B64D 29/04* (2013.01); *B64D 33/04* (2013.01); *F02K 1/625* (2013.01); *F02K 1/70* (2013.01); *F05D 2240/129* (2013.01)

(58) Field of Classification Search
CPC ... F02K 1/625; F02K 1/70; F02K 1/72; B64D 29/02; B64D 29/04; B64D 33/04
See application file for complete search history.

(56) References Cited

U.S. PATENT DOCUMENTS

| | | | |
|---|---|---|---|
| 3,599,432 A | 8/1971 | Ellis | |
| 5,309,711 A * | 5/1994 | Matthias | F02K 1/72 239/265.29 |
| 6,237,325 B1 * | 5/2001 | Hogie | B64D 45/02 60/226.2 |

(Continued)

FOREIGN PATENT DOCUMENTS

| | | |
|---|---|---|
| EP | 1229237 | 8/2002 |
| FR | 2987080 | 8/2013 |

OTHER PUBLICATIONS

Dietrich, Donald, "Performance of a Model Cascade Thrust Reverser for Short-Haul Applications", Oct. 1974, NASA Technical Memorandum.*

*Primary Examiner* — Steven Sutherland
(74) *Attorney, Agent, or Firm* — Haynes and Boone, LLP

(57) ABSTRACT

Systems and methods are provided for a formed thrust reverser cascade. The formed thrust reverser cascade may be coupled to an aircraft propulsor and may include a first portion disposed at a first angle to a portion of the aircraft propulsor and a second portion disposed at a second angle to the first portion. The formed thrust reverser cascade may be circumferentially disposed around a core engine of the aircraft propulsor. The formed thrust reverser cascades may be retrofitted to aircraft propulsors using linear thrust reverser cascade and may increase airflow through the formed thrust reverser cascade due to a greater throat area as compared to the linear thrust reverser cascade. Alternatively, the formed thrust reverser cascades may allow for shorter cascades while retaining the same performance, thus resulting in shorter nacelles.

20 Claims, 8 Drawing Sheets

(56) References Cited

U.S. PATENT DOCUMENTS

| | | |
|---|---|---|
| 8,720,183 B2 | 5/2014 | Welch et al. |
| 2014/0027536 A1 | 1/2014 | Gormley |
| 2015/0267643 A1 | 9/2015 | Gonidec et al. |

* cited by examiner

THRUST REVERSER CASCADE SYSTEMS AND METHODS

TECHNICAL FIELD

The disclosure relates generally to aircrafts and more specifically to aircraft thrust reversers.

BACKGROUND

Aircraft propulsor thrust reversers often include a cascade exit area (a.k.a. throat area) where airflow may exit from within the aircraft propulsor. Traditional cascades tend to be linear. Mass flow through the cascade may increase if the cascade exit area increases. Additionally, current aircraft propulsors may benefit from lighter weight and/or more compact thrust reverser cascades.

SUMMARY

Systems and methods are disclosed herein for a formed thrust reverser cascade. In certain examples, an aircraft propulsor may be provided and may include a nacelle including a thrust reverser aperture, a thrust reverser door configured to selectively move between an open position and a closed position to selectively block the thrust reverser aperture, a core engine circumscribed by the nacelle, wherein the nacelle and the core engine define, at least in part, a bypass flow path, and a thrust reverser cascade. The thrust reverser cascade may include a plurality of cascade vanes arranged in a ramp shaped cross-section, disposed circumferentially around the core engine, and configured to couple to a portion of the nacelle and permit airflow from the bypass flow path through the cascade vanes and a connecting structure coupled to at least two of the plurality of cascade vanes. The ramp shaped cross-section may include a first section configured to be disposed at a first angle to at least a portion of a surface of the nacelle and a second section disposed at a second angle to the first section.

In certain other examples, a thrust reverser cascade may be provided. The thrust reverser cascade may include a plurality of cascade vanes arranged in a ramp shaped cross-section and configured to couple to a portion of an aircraft propulsor nacelle and permit airflow through the cascade vanes and a connecting structure coupled to at least two of the plurality of cascade vanes. The ramp shaped cross-section may include a first section configured to be disposed at a first angle to at least a portion of a surface of the aircraft propulsor nacelle, and a second section disposed at a second angle to the first section.

In certain additional examples, a method may be provided. The method may include energizing airflow with a core engine of an aircraft propulsor such that the energized airflow flows within a bypass flow path of the aircraft propulsor defined, at least in part, by the core engine and a nacelle of the aircraft propulsor, moving a thrust reverser door of the aircraft propulsor to the open position, wherein the thrust reverser door is configured to selectively move between an open position and a closed position to selectively block a thrust reverser aperture disposed within the nacelle, and diverting at least a portion of the airflow through a thrust reverser cascade. The thrust reverser cascade may include a plurality of cascade vanes arranged in a ramp shaped cross-section, disposed circumferentially around the core engine, and configured to couple to a portion of the nacelle and permit airflow from the bypass flow path through the cascade vanes and a connecting structure coupled to at least two of the plurality of cascade vanes. The ramp shaped cross-section may include a first section configured to be disposed at a first angle to at least a portion of a surface of the nacelle and a second section disposed at a second angle to the first section.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Thrust reverser cascades are described in the disclosure herein in accordance with one or more embodiments. The thrust reverser cascade may be coupled to an aircraft propulsor and may be of a shape that would increase the cascade exit area of the thrust reverser cascade. In certain examples, the thrust reverser cascade may be ramp shaped. In addition, the aircraft propulsor may include one or more thrust reverser doors that may move between the open and closed position to allow or prevent, respectively, airflow through the thrust reverser cascade. Airflow through the thrust reverser cascade may provide reverse thrust to slow an aircraft that the aircraft propulsor is coupled to.

Figure 1A:
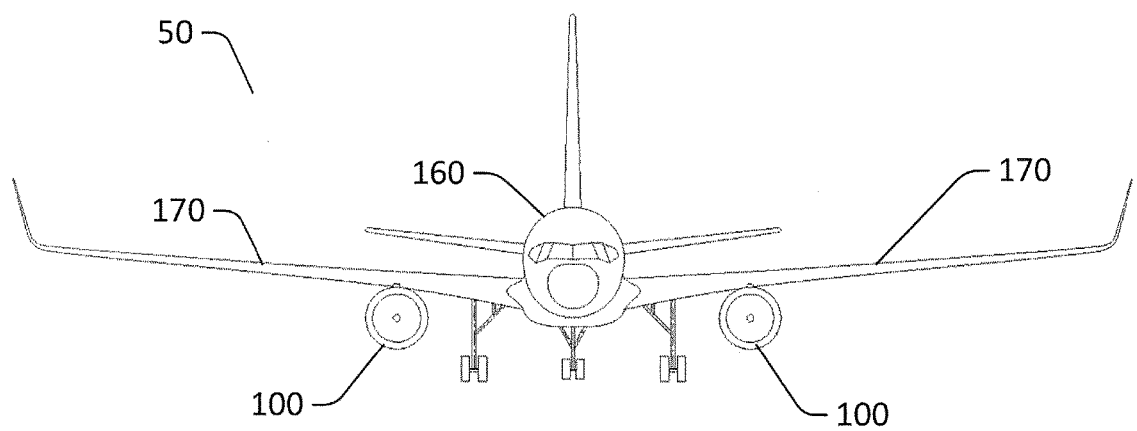
FIG. 1A illustrates a front view of an aircraft in accordance with an example of the disclosure.

FIG. 1A illustrates a front view of an aircraft in accordance with an example of the disclosure. FIG. 1A illustrates an aircraft 50 with a fuselage 160, wings 170, and aircraft propulsors 100. The aircraft propulsors 100 may be attached to the wings 170, but in other examples, the aircraft propulsors 100 may be attached to other portions of the aircraft 50 such as the fuselage 160.

Figure 1B:
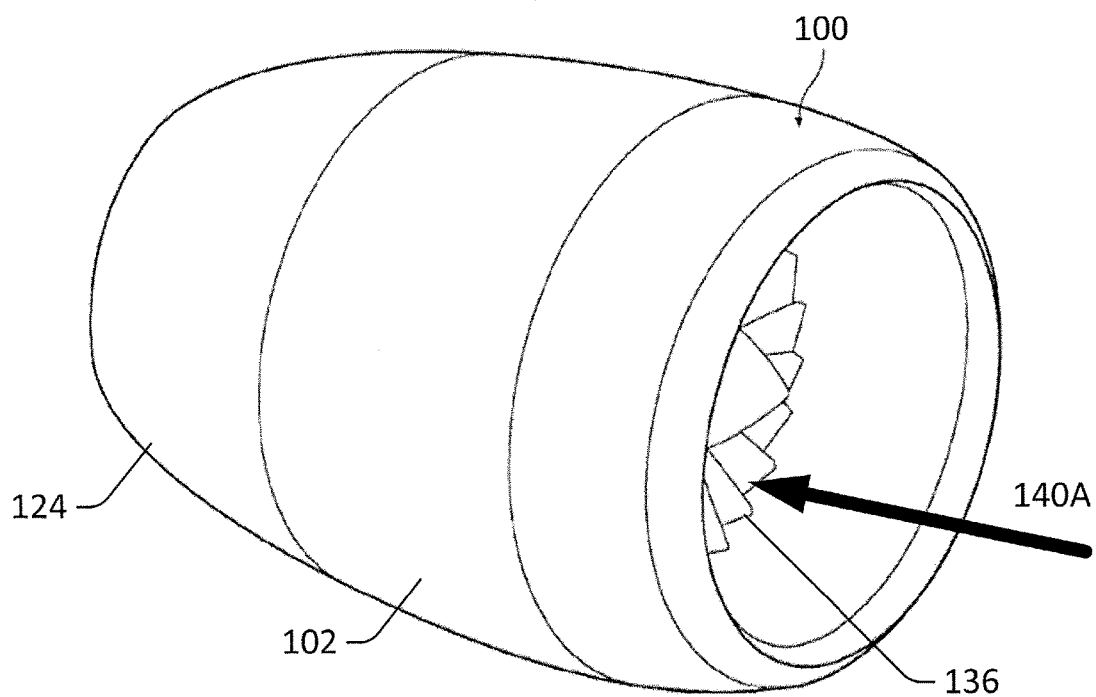
FIG. 1B illustrates a perspective view of an aircraft propulsor in accordance with an example of the disclosure.

FIG. 1B illustrates a perspective view of an aircraft propulsor in accordance with an example of the disclosure. Aircraft propulsor 100 may include a nacelle 102, a translating sleeve 124, and a fan 136. In the example shown in FIG. 1B, the nacelle 102 may contain the fan 136, but other examples of the aircraft propulsor may arrange the fan so that the fan is not contained by the nacelle (e.g., in, for example, a turboprop configuration). The fan 136 may intake and/or energize air flowing into the nacelle 102, such as in an airflow direction 140A. Air that flows into the nacelle 102 via airflow direction 140A may flow through various internal flow paths within the nacelle 102. When the aircraft propulsor 100 is in a thrust reversing configuration, air that flows into the nacelle 102 in airflow direction 140A may be redirected to another direction to provide reverse thrust.

When the aircraft propulsor 100 is normally operating (e.g., providing thrust), the translating sleeve 124 (e.g., a thrust reverser door) may be in a closed position that blocks the thrust reverser aperture (shown in FIG. 2 as thrust reverser aperture 132), sealing or substantially sealing the thrust reverser aperture so that there is no or minimal airflow through the thrust reverser aperture 132. When the aircraft propulsor 100 is in a thrust reversing configuration (e.g., providing reverse thrust to, for example, slow the aircraft 50 that the aircraft propulsor 100 may attached to), the translating sleeve 124 may be in an open position that does not block the thrust reverser aperture 132, allowing for air to flow through the thrust reverser aperture 132. In certain examples, the translating sleeve 124 may form the thrust reverser aperture 132 when the translating sleeve 124 is in the open configuration. In such an example, there may be no thrust reverser aperture 132 when the translating sleeve 124 is in a closed configuration.

Figure 2:
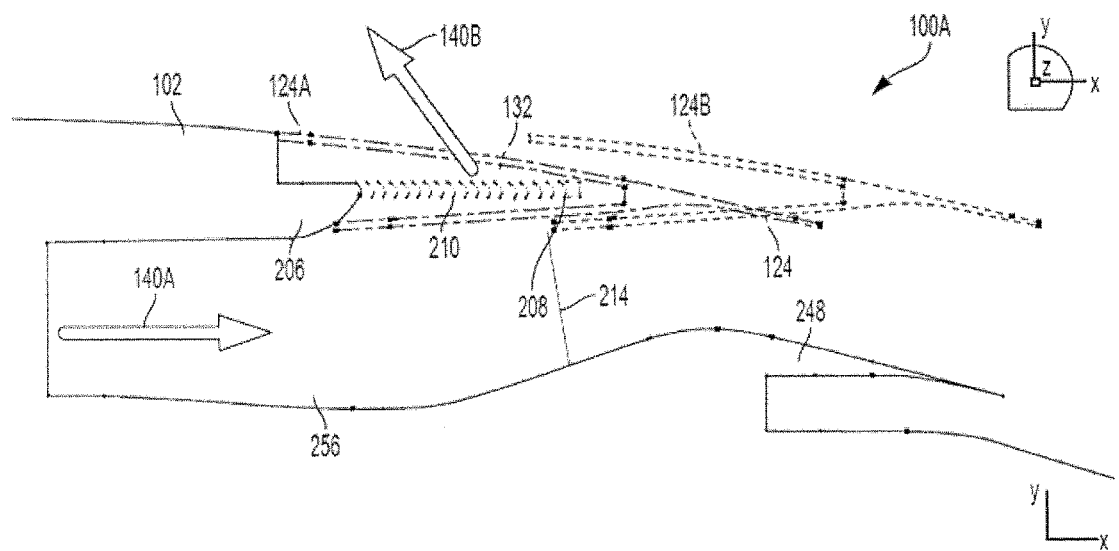
FIG. 2 illustrates a side cutaway view of an aircraft propulsor in accordance with an example of the disclosure.

FIG. 2 illustrates a side cutaway view of an aircraft propulsor in accordance with an example of the disclosure. The aircraft propulsor 100 shown in FIG. 2 may include the nacelle 102 with a bullnose 206, the translating sleeve 124, a core engine 248, a linear thrust reverser cascade 210, a cascade support ring 208, a thrust reverser aperture 132, and a blocker door 214. The core engine 248 and/or the nacelle 102 may define, at least in part, a bypass flow path 256. Air energized by the fan 136 may flow through the bypass flow path 256. During normal operations, the energized air may flow out of an exhaust of the nacelle 102, but during thrust reversing, the energized air may be diverted by the blocker door 213 and flow out of nacelle 102 through the thrust reverser cascade and the thrust reverser aperture 132.

The nacelle 102 may be similar to the nacelle described in FIG. 1B. The nacelle 102 in FIG. 2 may additionally include the bullnose 206. The bullnose 206 may be any structure that may couple to an end of the linear thrust reverser cascade 210. In certain examples, the bullnose 206 may extend from another portion of the nacelle 102 and may form a ledge of the nacelle 102. As shown in FIG. 2, at least the portion of the bullnose 206 facing the core engine 208 may include a smoothly radius'd surface. Such a radius'd surface may allow for smooth airflow from the bypass flow path 256 through the linear thrust reverser cascade 210 and, accordingly, allow for higher massflow through the linear thrust reverser cascade 210. A surface of the translating sleeve 124 may be configured to be placed adjacent to or coupled to a portion of the bullnose 206 when in the closed position. As such, the translating sleeve 124 may, when in the closed position, form a smooth or substantially smooth surface with an interior surface of the nacelle 102 to allow for smooth airflow within the aircraft propulsor 100 when the translating sleeve 124 is in the closed position.

FIG. 2 further illustrates the open and closed positions of the translating sleeve 124. As shown, the translating sleeve 124 may be in an open position 124B as well as a closed position 124A. The translating sleeve 124 in other examples may be configured to be in other positions. Additionally, other examples may include non-translating thrust reverser doors (e.g., thrust reverser doors that may rotate between an open and a closed position, as well as other positions) as well as thrust reverser doors that open and close in other manners (e.g., through shutters, through the deployment of air deflectors, or through other manners).

In the closed position 124A, the translating sleeve 124 may allow air to flow through the bypass flow path 256 of the aircraft propulsor 100 and exit the bypass flow path 256 through an exhaust to provide thrust. The bypass flow path 256 may be defined, at least in part, by portions of the core engine 248 and/or the nacelle 102. The air flowing through the bypass flowpath 256 may be energized by the fan 136, may generally flow in airflow direction 140A, and may provide thrust (or reverse thrust) to power the aircraft that the aircraft propulsor 100 is attached to. The core engine 248 may power the fan 136 and the fan 136 may energize the air flowing through the bypass flowpath 256.

When the translating sleeve 124 is in the closed position 124A, the blocker door 214 may be positioned to not block or minimally block (e.g., be a restriction of less than 5% of total airflow within the bypass flow path 256) airflow within the bypass flow path 256.

In the open position 124B, the translating sleeve 124 may allow air to flow through the thrust reverser aperture 132. In certain examples, when the translating sleeve 124 is in the open position 124B, the blocker door 214 may also be moved into a position to block at least a portion of the bypass flow path 256 to divert airflow within the bypass flow path 256 through the thrust reverser aperture 132. Such diverted airflow may at least in part flow in airflow direction 140B or in the general direction of airflow direction 140B. Air flowing in airflow direction 140B may provide reverse thrust.

Diverted airflow may flow through the linear thrust reverser cascade 210. The linear thrust reverser cascade 210 shown in FIG. 2 may be a linear thrust reverser cascade. Though FIG. 2 shows a side cutaway view of the linear thrust reverser cascade 210, the linear thrust reverser cascade 210 may be circumferentially disposed and/or offset from, for example, the core engine 248 or another portion of the aircraft propulsor 100. E.g., the linear thrust reverser cascade 210 may "wrap around" the core engine 248. Additionally, the linear thrust reverser cascade 210 may extend linearly, or substantially linearly, from the bullnose 206 to the cascade support ring 208. The bullnose 206 and/or the cascade support ring 208 may be coupled to the linear thrust reverser cascade 210. The bullnose 206 and/or the cascade support ring 208 may support and/or hold in place the linear thrust reverser cascade 210. In certain such examples, the cascade support ring 208 may be attached to other structural features of the aircraft propulsor 100.

Figure 3:
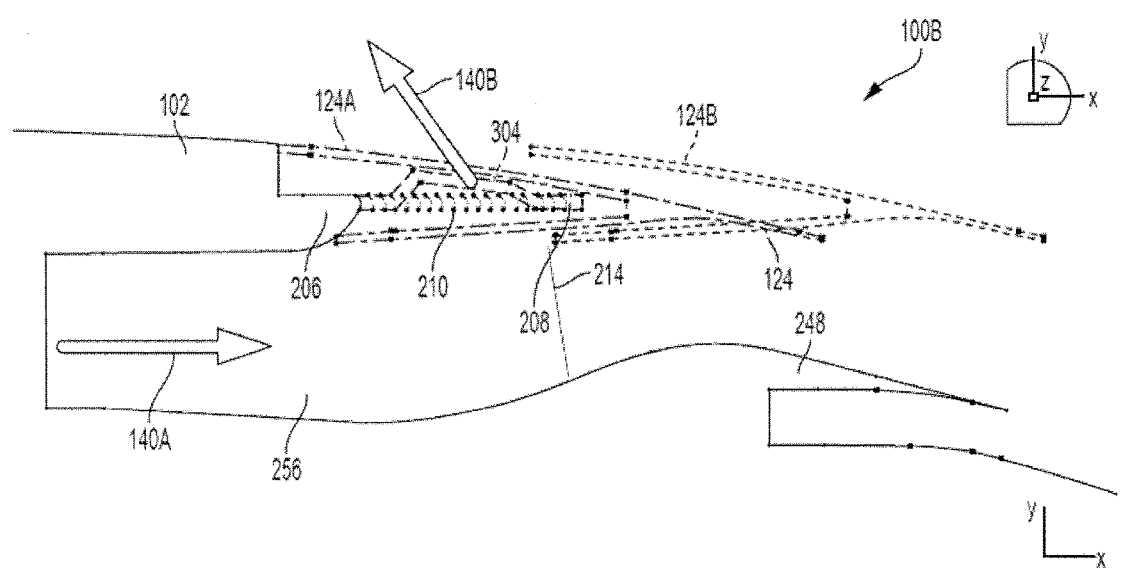
FIG. 3 illustrates a side cutaway view of a formed thrust reverser cascade equipped aircraft propulsor in accordance with an example of the disclosure.

FIG. 3 illustrates a side cutaway view of a formed thrust reverser cascade equipped aircraft propulsor in accordance with an example of the disclosure. The formed thrust reverser cascade 304 may increase the cascade exit area (e.g., the "throat" area) of a thrust reverser cascade. FIG. 3 illustrates the formed thrust reverser cascade 304 graphically overlaid over the linear thrust reverser cascade 210 of FIG. 2 to illustrate differences between the formed thrust reverser cascade 304 and the linear thrust reverser cascade 210.

The formed thrust reverser cascade 304 may be circumferentially disposed and/or offset from the core engine 248 or another portion of the aircraft propulsor 100. The formed thrust reverser cascade 304 may include a first portion disposed at a first angle to (e.g., not parallel with) at least a portion of a surface of the bullnose 206 and/or the cascade support ring 208. The first angle may be any angle, including angles of approximately less than 20 degrees, approximately 20 to 50 degrees, approximately 50 to 90 degrees, and/or 90 degrees or more.

Figure 4A:
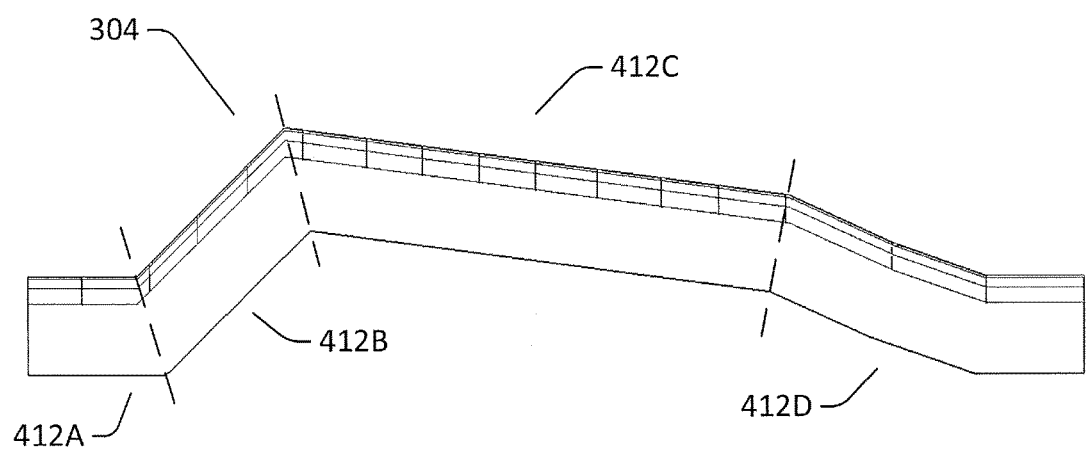
FIG. 4A illustrates a side view of a formed thrust reverser cascade in accordance with the disclosure.
Figure 4B:
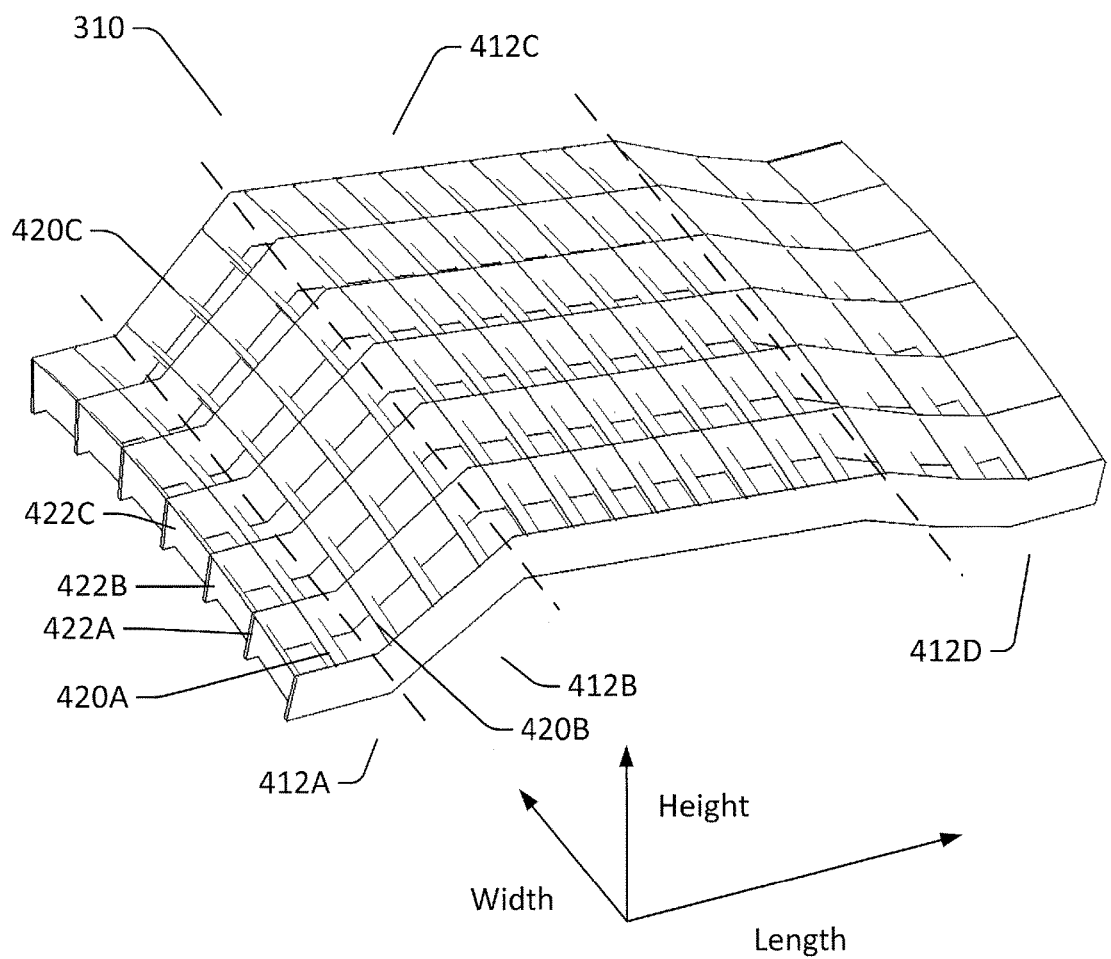
FIG. 4B illustrates a perspective view of a formed thrust reverser cascade in accordance with examples of the disclosure.

The formed thrust reverser cascade 304 may additionally include a second portion disposed at a second angle to at least the first portion. The second angle may be any angle, including angles of approximately less than 20 degrees, approximately 20 to 50 degrees, approximately 50 to 90 degrees, and/or 90 degrees or more. Accordingly the formed thrust reverser cascade 304 may form a "bridge" shape, as illustrated in FIGS. 3-4B, where a section of the formed thrust reverser cascade 304 may be raised, as compared to the linear thrust reverser cascade 210. In certain such examples, at least a part of the raised portion of the formed thrust reverser cascade 304 may be shaped to be close to a surface of the thrust reverser door 124, whether in the open or closed position, to further increase the cascade exit area. Such a configuration may be shown by the middle portion of the formed thrust reverser cascade 304. In certain such examples, such a portion of the formed thrust reverser cascade 304 may be disposed within less than an inch, within less than five inches, within less than ten inches, within less than two feet, or within two feet or more of the thrust reverser door 124.

The cascade exit area is increased, at least in part, due to the raised portion of the formed thrust reverser cascade 304. The raised portion may increase the surface area of the thrust reverser cascade 304 as compared to a linear thrust reverser cascade of the same length. For example, as shown in FIG. 3, the formed thrust reverser cascade 304 and the linear thrust reverser cascade 210 are the same length. However, the raised portion of the formed thrust reverser cascade 304 may be farther from, for example, a centerline of the core engine 248 and/or a centerline of such a thrust reverser cascade. The formed thrust reverser cascade 304 and/or the linear thrust reverser cascade 210 may be cylindrical, substantially cylindrical, and/or partially cylindrical. FIGS. 2, 3, and 4A may show a cross section of such a cylindrical, substantially cylindrical, and/or partially cylindrical formed thrust reverser cascade 304 and/or the linear thrust reverser cascade 210. As the raised portion of the formed thrust reverser cascade 304 is farther from such a centerline than the corresponding portion of the linear thrust reverser cascade 210, the surface area and hence, the cascade exit area, of the formed thrust reverser cascade 304 may be greater than the cascade exit area of the linear thrust reverser cascade 210.

A greater cascade exit area may allow for a higher massflow of air through the thrust reverser cascade. A higher massflow of air may, accordingly, allow for increased thrust reversing capabilities. Additionally or alternatively, a greater cascade exit area may allow for a smaller (e.g., shorter) nacelle. E.g., a formed thrust reverser cascade may be shorter than a linear thrust reverser cascade of the same massflow. As such, a nacelle using a formed thrust reverser cascade may be a shorter length and/or smaller diameter than a nacelle with a linear thrust reverser cascade. Such a smaller nacelle may allow for lower drag, lower weight, or higher efficiencies in other manners.

FIG. 4A illustrates a side view of a formed thrust reverser cascade in accordance with the disclosure. FIG. 4A may illustrate a cross section of the formed thrust reverser cascade. The formed thrust reverser cascade 304 in FIG. 4A may include a bullnose coupling portion 412A, a first portion 412B, a second portion 412C, and a third portion 412D. One, some, or all of the portions 412A-D may include openings that allow air to flow through. Though the portions 412A-D of the formed thrust reverser cascade 304 may be distinct portions (e.g., may include sharp bends between portions), other examples may include portions that include smoother transitions (e.g., radius'd transitions) between the portions or may include portions that constantly transition to other geometries (e.g., the formed thrust reverser or a portion thereof may be one or multiple continuous radius). Other examples of the formed thrust reverser cascade may omit certain portions of the formed thrust reverser cascade 304 illustrated in FIG. 4A and/or may include other portions not described in FIG. 4A.

The bullnose coupling portion 412A be configured to couple to the bullnose 206. The bullnose coupling portion 412A may also be parallel or substantially parallel (e.g., +/−15 degrees from parallel) with the bullnose 206. Certain examples of the formed thrust reverser cascade 304 may not include the bullnose coupling portion 412A and may, instead, be configured to couple to the bullnose 206 via the first portion 412B.

The first portion 412B may be disposed at a first angle to the bullnose coupling portion 412A and/or a portion of the nacelle 102, such as the bullnose 206, that the formed thrust reverser cascade 304 may be configured to couple to. The second portion 412C may be disposed at a second angle to, at least, the first portion 412B. Accordingly, the second portion 412C may, additionally, be disposed of at an angle to the bullnose coupling portion 412A and/or a portion of the nacelle 102.

The first portion 412B may, in certain examples, be a portion of the formed thrust reverser cascade 304 that raises the second portion 412C or another portion of the formed thrust reverser cascade 304 towards a portion of the aircraft propulsor 100 such as the translating sleeve 124. As such, in certain examples, the second portion 412C may be configured to be, for example, within less than an inch, within less than five inches, within less than ten inches, within less than two feet, or within two feet or more of the thrust reverser door 124. At least a part of the second and/or third portions 412B and/or 412C may be farther from the centerline of the core engine 208 than the bullnose coupling portion 412A and/or the bullnose 206 (or another portion of the aircraft nacelle 102).

The third portion 412D may be configured to couple to the cascade support ring 208 or another portion of the aircraft propulsor 100. The third portion 412D may include features (e.g., one or more forms, folds, bends, chamfers, and/or other features) allowing the formed thrust reverser cascade 304 to couple to the cascade support ring 208. As such, the formed thrust reverser cascade 304 may be retrofitted to existing aircraft propulsors that utilize linear or other thrust reverser cascades.

FIG. 4B illustrates a perspective view of a formed thrust reverser cascade in accordance with examples of the disclosure. FIG. 4B may illustrate a perspective view of the formed thrust reverser cascade 304 described in FIG. 4A. The formed thrust reverser cascade 304 includes eggcrate shaped openings that allow for airflow through the openings, but other examples may include strake, gill, or other shaped openings. The openings may be defined, at least in part, by cascade vanes configured to direct air such as formed thrust reverser cascade vanes 420A-C, as well as other cascade vanes. Additionally, the cascade vanes may be coupled to support structures, such as support structures 422A-C, that connect a plurality of the formed thrust reverser cascade vanes. The support structures 422A-C, in certain examples, may also condition airflow flowing through the formed thrust reverser cascade 304. In certain examples, the cascade vanes may be arranged in substantially the width-wise direction while the support structures may be arranged in substantially the length-wise direction, though other examples may arrange the cascade vanes and/or the support structures in other directions.

In FIG. 4B, the formed thrust reverser cascade 304 may include a curved radii to allow the formed thrust reverser cascade 304 to be mounted on the nacelle 102. As the nacelle 102 may be curved, the formed thrust reverser cascade 304 may include a curvature that matches or substantially matches a portion of the nacelle 102. For example, the formed thrust reverser cascade 304 may be curved to match or substantially match the curvature of the bullnose 206. As such, the width direction and/or other direction of the of the formed thrust reverser cascade 304 may be curved to allow the formed thrust reverser cascade 304 to be disposed circumferentially around the core engine 248.

Figure 5:
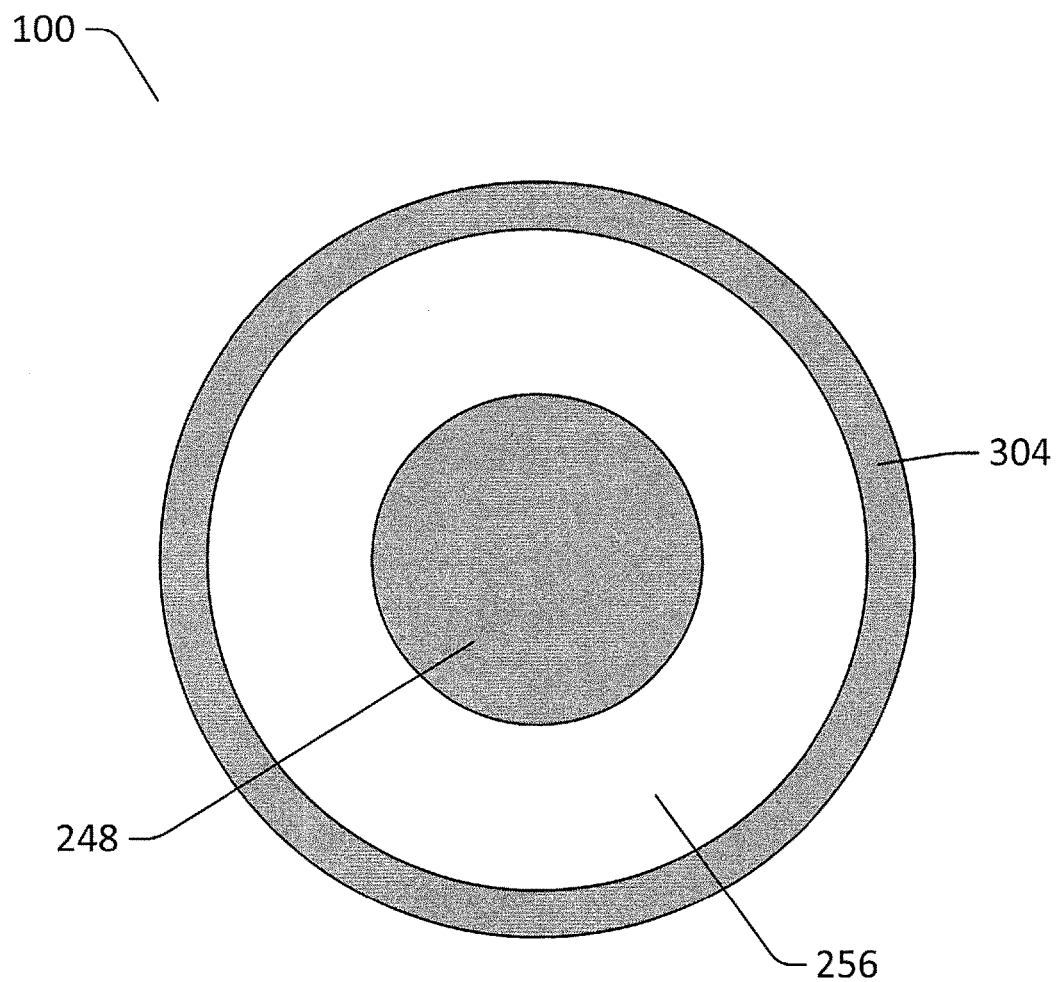
FIG. 5 illustrates a front cutaway view of an aircraft propulsor with a thrust reverser cascade disposed circumferentially around the core engine in accordance with examples of the disclosure.

Certain examples of the aircraft propulsor 100 may include formed thrust reverser cascades that are disposed circumferentially around a portion or around the entire perimeter of the core engine 248. FIG. 5 illustrates a front cutaway view of an aircraft propulsor with a thrust reverser cascade disposed circumferentially around the core engine in accordance with examples of the disclosure.

The aircraft propulsor 100 of FIG. 5 includes the core engine 248, the formed thrust reverser cascade 304, and the bypass flow path 256. As shown in FIG. 5, the formed thrust reverser cascade 304 may be disposed circumferentially around the entire perimeter of the core engine 248. The bypass flow path 256 may be disposed of between the core engine 248 and the formed thrust reverser cascade 304. Airflow within the bypass flow path 256, energized by the core engine 248, may be redirected through the formed thrust reverser 304 to provide reverse thrust for the aircraft propulsor 100.

Figure 6:
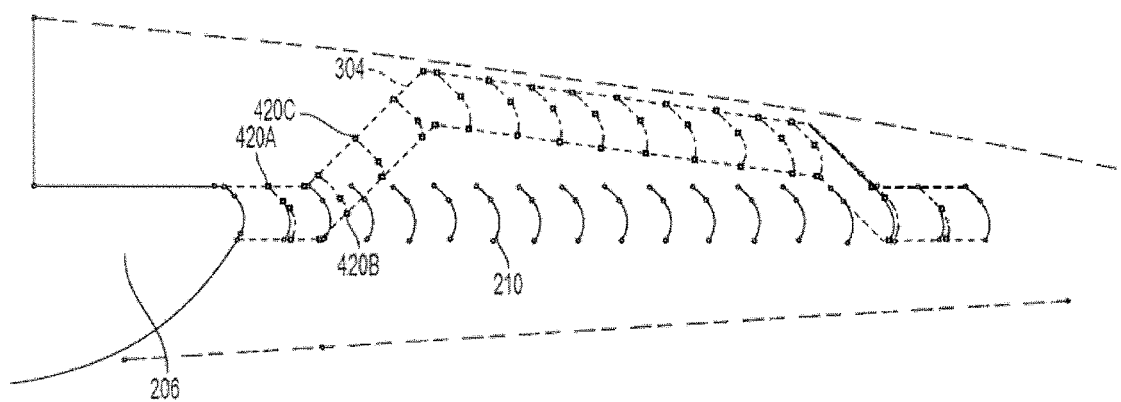
FIG. 6 illustrates a side cutaway view of a linear thrust reverser cascade compared to a formed thrust reverser cascade in accordance with examples of the disclosure.

FIG. 6 illustrates a side cutaway view of a linear thrust reverser cascade compared to a formed thrust reverser cascade in accordance with examples of the disclosure. The formed thrust reverser cascade 304 includes a plurality of formed thrust reverser cascade vanes, including formed thrust reverser cascade vanes 420A-C.

The formed thrust reverser cascade vanes 420A-C, as well as other formed thrust reverser cascade vanes, may include radii, chamfers, vanes, and other angled features that may redirect air. Such features may allow for increased thrust reversing capabilities for the aircraft propulsor 100 by, for example, changing the direction of airflow to provide greater reverse thrust. In certain examples, the formed thrust reverser cascade vanes in different portions of the formed thrust reverser cascade 304 may be different geometries to condition the airflow to more optimally provide reverse thrust. Additionally, in certain examples, such as in situations where the formed thrust reverser cascade is retrofitted onto existing propulsors, the geometries of the formed thrust reverser cascade vanes may be shaped so that air exiting from the formed thrust reverser cascade vanes may flow in the same direction or substantially the same direction as that of the air exiting from the vanes of the linear thrust reverser cascade.

During computer simulations, the formed thrust reverser cascade has shown increased performance as compared to a linear thrust reverser cascade. In certain examples, a linear thrust reverser cascade may be disposed of at a distance of approximately 75 inches from a centerline of a core engine. A formed thrust reverser cascade may, due to the raised portion, be disposed of at an average distance of approximately 80 inches from the centerline of the core engine while being the same length as the linear thrust reverser cascade. Such a formed thrust reverser may allow for an approximately 3-4% higher airflow rate as compared to the linear thrust reverser cascade. As such, the formed thrust reverser cascade may allow for higher reverse thrust.

Additionally or alternatively, the formed thrust reverser cascade may allow for a more compact aircraft propulsor. Returning to the example above, the formed thrust reverser cascade disposed of at an average distance of approximately 80 inches from the centerline of the core engine may be 4% shorter while maintaining the same airflow rate as the linear thrust reverser cascade disposed of at a distance of approximately 75 inches from the centerline of the core engine. As such, the formed thrust reverser cascade may be used to additionally or alternatively decrease the size of the aircraft propulsor.

Examples described above illustrate but do not limit the invention. It should also be understood that numerous modifications and variations are possible in accordance with the principles of the present invention. Accordingly, the scope of the invention is defined only by the following claims.

What is claimed is:

1. An aircraft propulsor comprising:
   a nacelle comprising a thrust reverser aperture;
   a thrust reverser door configured to selectively move between an open position and a closed position to selectively block the thrust reverser aperture;
   a core engine circumscribed by the nacelle, wherein the nacelle and the core engine define, at least in part, a bypass flow path; and
   a thrust reverser cascade comprising:
      a plurality of cascade vanes arranged in a ramp shaped cross-section, disposed circumferentially around the core engine, and configured to couple to a portion of the nacelle and permit airflow from the bypass flow path through the plurality of cascade vanes, wherein the ramp shaped cross-section comprises:
         a first section comprising a first section first end and a first section second end, wherein the first section first end is disposed closer to the core engine than the first section second end; and
         a second section disposed at a first angle to the first section and comprising a second section first end and a second section second end, wherein the second section first end connects to the first section second end; and
         a third section disposed at a second angle to the second section and comprising a third section first end and a third section second end, wherein the third section first end connects to the second section second end, and wherein the third section second end is disposed closer to the core engine than the third section first end; and
      a support structure coupled to at least two of the plurality of cascade vanes.

2. The aircraft propulsor of claim 1, wherein at least one of the plurality of cascade vanes comprises an angled cross-sectional shape.

3. The aircraft propulsor of claim 2, wherein the plurality of cascade vanes comprise angled cross-sectional shapes.

4. The aircraft propulsor of claim 2, wherein the plurality of cascade vanes are configured to redirect airflow to provide thrust to slow an aircraft.

5. The aircraft propulsor of claim 1, wherein the second section is disposed within two feet of the thrust reverser door.

6. The aircraft propulsor of claim 1, wherein at least a portion of the second section is disposed closer to a portion of the thrust reverser door than at least a portion of the first section when the thrust reverser door is in the closed position.

7. The aircraft propulsor of claim 1, wherein at least a portion of the second section is disposed farther from a centerline of the core engine than at least a portion of the first section.

8. The aircraft propulsor of claim 1, wherein the thrust reverser cascade is coupled to a bullnose of the nacelle at a cascade first end and coupled to a cascade support ring at a cascade second end.

9. The aircraft propulsor of claim 1, further comprising a blocker door, the blocker door configured to move to at least a deployed position to divert at least a portion of the airflow within the bypass flow path through the plurality of cascade vanes.

10. An aircraft comprising the aircraft propulsor of claim 1, the aircraft comprising:
  a fuselage; and
  a wing, wherein the aircraft propulsor is coupled to the fuselage and/or the wing.

11. A thrust reverser cascade comprising:
  a plurality of cascade vanes arranged in a ramp shaped cross-section and configured to couple to a portion of an aircraft propulsor nacelle and permit airflow through the plurality of cascade vanes, wherein the ramp shaped cross-section comprises:
    a first section comprising a first section first end and a first section second end, wherein the first section second end is configured to be disposed closer to at least a portion of a surface of the aircraft propulsor nacelle than the first section first end;
    a second section disposed at a first angle to the first section and comprising a second section first end and a second section second end, wherein the second section first end connects to the first section second end; and
    a third section disposed at a second angle to the second section and comprising a third section first end and a third section second end, wherein the third section first end connects to the second section second end, and wherein the third section first end is configured to be disposed closer to at least a portion of the surface of the aircraft propulsor nacelle than the third section second end; and
  a support structure coupled to at least two of the plurality of cascade vanes.

12. The thrust reverser cascade of claim 11, wherein the plurality of cascade vanes are configured to be disposed circumferentially around a core engine of an aircraft propulsor.

13. The thrust reverser cascade of claim 11, wherein at least one of the plurality of cascade vanes comprises an angled cross-sectional shape.

14. The thrust reverser cascade of claim 13, wherein the plurality of cascade vanes comprise angled cross-sectional shapes.

15. The thrust reverser cascade of claim 11, wherein the second section is configured to be disposed within two feet of a thrust reverser door of the aircraft propulsor.

16. The thrust reverser cascade of claim 11, wherein at least a portion of the second section is configured to be disposed closer to a portion of a thrust reverser door of the aircraft propulsor than at least a portion of the first section.

17. The thrust reverser cascade of claim 11, wherein a cascade first end of the thrust reverser cascade is configured to couple to a bullnose of the aircraft propulsor nacelle and a cascade second end of the thrust reverser cascade is configured to couple to a cascade support ring.

18. A method comprising:
  energizing airflow with a core engine of an aircraft propulsor such that the energized airflow flows within a bypass flow path of the aircraft propulsor defined, at least in part, by the core engine and a nacelle of the aircraft propulsor;
  moving a thrust reverser door of the aircraft propulsor to an open position, wherein the thrust reverser door is configured to selectively move between the open position and a closed position to selectively block a thrust reverser aperture disposed within the nacelle; and
  diverting at least a portion of the airflow through a thrust reverser cascade, wherein the thrust reverser cascade comprises:
    a plurality of cascade vanes arranged in a ramp shaped cross-section, disposed circumferentially around the core engine, and configured to couple to a portion of the nacelle and permit airflow from the bypass flow path through the plurality of cascade vanes, wherein the ramp shaped cross-section comprises:
      a first section comprising a first section first end and a first section second end, wherein the first section first end is disposed closer to the core engine than the first section second end; and
      a second section disposed at a first angle to the first section and comprising a second section first end and a second section second end, wherein the second section first end connects to the first section second end; and
      a third section disposed at a second angle to the second section and comprising a third section first end and a third section second end, wherein the third section first end connects to the second section second end, and wherein the third section second end is disposed closer to the core engine than the third section first end; and
    a support structure coupled to at least two of the plurality of cascade vanes.

19. The method of claim 18, wherein diverting at least the portion of the airflow through the thrust reverser cascade comprises diverting at least the portion of the airflow with a blocker door in a deployed position.

20. The method of claim 18, wherein the airflow is diverted to provide reverse thrust to slow an aircraft.

* * * * *

UNITED STATES PATENT AND TRADEMARK OFFICE
CERTIFICATE OF CORRECTION

PATENT NO. : 10,309,341 B2
APPLICATION NO. : 14/997295
DATED : June 4, 2019
INVENTOR(S) : Naimishkumar B. Harpal and Chuck Chen Page 1 of 1

It is certified that error appears in the above-identified patent and that said Letters Patent is hereby corrected as shown below:

In the Claims

At Column 8, Line 45, Claim 1 change "the first section second end; and" to --the first section second end;--

At Column 10, Line 38, Claim 18 change "the first section second end; and" to --the first section second end;--

Signed and Sealed this
Third Day of September, 2019

Andrei Iancu
*Director of the United States Patent and Trademark Office*